US005375308A

United States Patent [19]

[11] Patent Number: 5,375,308

[45] Date of Patent: Dec. 27, 1994

Harris

[54] VALVE SPRING COMPRESSOR APPARATUS

[75] Inventor: Burgess C. Harris, Sedalia, Colo.

[73] Assignee: Safety and Performance Systems, Inc., Highlands Ranch, Colo.

[21] Appl. No.: 238,988

[22] Filed: May 6, 1994

Related U.S. Application Data

[63] Continuation of Ser. No. 4,941, Jan. 15, 1993, abandoned.

[51] Int. Cl.[5] .............. B23P 19/04

[52] U.S. Cl. .............. 29/215; 29/249

[58] Field of Search .............. 29/215–221, 29/249, 280, 282, 252, 888.42

[56] References Cited

U.S. PATENT DOCUMENTS 1,439,530 12/1922 Schermerhorn .............. 29/215
1,474,292 11/1923 Ruttinger .............. 29/215
1,488,880 4/1924 Hunter .............. 29/215
2,566,460 9/1951 Mihalic .............. 29/215
2,691,209 10/1954 Stearns .............. 29/215
4,585,211 4/1986 Griffin .............. 254/10.5
5,226,229 7/1993 Pierce .............. 29/215

*Primary Examiner*—Robert C. Watson
*Attorney, Agent, or Firm*—Gregg I. Anderson

[57] ABSTRACT

A valve spring compressor apparatus for removing and installing valve springs on automotive racing engines includes a valve seat and a compressor pump assembly. The valve seat is placed between the valve spring and the engine housing. The compressor engages the valve spring seat with a support arm and extends a piston toward the valve spring seat, thus compressing the valve spring and allowing for the removal of the retainer ring and keeper lock. The compressor uses a source of compressed air to drive a power piston into a compression chamber multiplying the supply air pressure several times. This multiplied air pressure is retained in the extension piston chamber by a one-way valve. As the extension piston extends, the multiplied air pressure in the extension piston is maintained by repeated cycling of the compressor.

9 Claims, 8 Drawing Sheets

76
11
134
118
67
110
114
62
116
11
102

76
134
12
120
110
62
116
12
102

76
134
120
118
67
110
62
116

76
120
67
118
110
62
116

168
130
74
156
174
170
176
72
140
148
142
150
84
178
78
136
82

VALVE SPRING COMPRESSOR APPARATUS

This is a continuation of copending application Ser. No. 08/004,941 filed Jan. 15, 1993, now abandoned.

BACKGROUND OF THE INVENTION

1. Field of the Invention

The present invention pertains to an apparatus and method for removing or installing the valve spring of an internal combustion engine. More particularly, the present invention relates to an apparatus finding particular but not exclusive utility for compressing and removing valve springs from assembled high performance automotive racing engines. The apparatus includes a compressor for multiplying the supply air pressure and exerting a large clamping force as a result.

2. Discussion of Prior Art

The extreme demands on racing engines make rebuilding engines and replacing parts a commonplace occurrence. Drag racing engines may have valve springs replaced at the racetrack between each race in the day. The springs may be removed and replaced in one of two ways. The first way can be performed with the engine assembled while the second way can only be performed with the engine disassembled to provide access to the interior of the engine housing and cylinder so that pressure may be applied to the face of the valve.

The valve spring can be removed from an assembled engine with the use of a mechanical tool designed to be used as a lever to apply pressure to and compress the valve spring while air pressure is applied in the cylinder through the opening in the cylinder resulting from the removed spark plug. As be seen, this method necessitates both removal of the spark plug and a significant amount of human strength to compress the spring.

The valve spring can be removed from a disassembled engine with either a similar mechanical lever tool or with a single stage air cylinder tool. This air cylinder tool can only be used to remove springs from a disassembled engine. With the engine disassembled the valve can be held in a closed position by the tool while the air cylinder compresses the spring allowing for removal. The air cylinder tool is a single stage tool for applying supply air pressure to a piston to exert force against the valve spring.

It can be appreciated that these prior art devices have the disadvantage of requiring either the spark plug to be removed and a great deal of human strength applied or the engine to be disassembled.

It is against this background, and the desire to provide an easier, quicker system to remove and replace valve springs on automotive racing engines, that the present invention has resulted.

OBJECTS OF THE INVENTION

It is the principal object of this invention to provide an apparatus and method for easily and conveniently compressing and removing valve springs from internal combustion engines.

It is further an object of this invention to provide an apparatus and method for compressing and removing valve springs from internal combustion engines through the use of compressed air.

It is another object of this invention to provide an apparatus and method for compressing and removing valve springs from assembled high performance automotive racing engines.

It is another object of this invention to provide an apparatus and method for compressing and removing valve springs from internal combustion engines with a minimum of supply air pressure.

SUMMARY OF THE INVENTION

The present invention provides a method and apparatus for compressing and removing or installing a valve spring on a valve stem of an automotive engine. The two-part apparatus includes a valve spring seat which is placed between the valve spring and the engine housing with the valve cover removed. The two-part apparatus also includes an air compressor with sufficient clamping force to compress the valve spring between the compressor and the valve spring seat sufficiently to allow the keeper lock and retainer ring, which hold the valve spring on the valve stem, to be removed from the valve stem.

In accordance with one significant aspect of the present invention, the valve spring seat has an engagement ring formed thereon to allow the compressor to engage the seat.

In accordance with another significant aspect of the invention, the compressor of the present invention involves an extension piston which is extended toward a support which is engaged with the engagement ring of the valve spring seat.

In accordance with still another significant aspect of the invention, subsequent to the removal of a valve spring, the compressor is again used to install another valve spring by similarly compressing the valve spring so that the retainer ring and keeper lock can be installed.

A more complete understanding and appreciation of the present invention can be obtained by reference to the accompanying drawings, which are briefly described below, from the following detailed description of the preferred embodiment, and from the appended claims.

DETAILED DESCRIPTION OF THE PREFERRED EMBODIMENT

A presently preferred embodiment of a two-part valve spring compressor apparatus or tool 60 is comprised of a valve spring seat 62 and a pump assembly or motor 64 (FIGS. 1-4). The pump assembly 64 engages the valve spring seat 62 and moves a piston against a valve spring, thereby compressing the valve spring.

Figure 8:
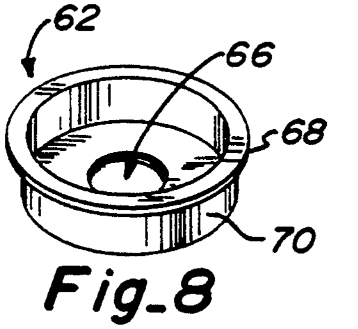
FIG. 8 is a perspective view of the valve spring seat of the present invention.
Figure 6:
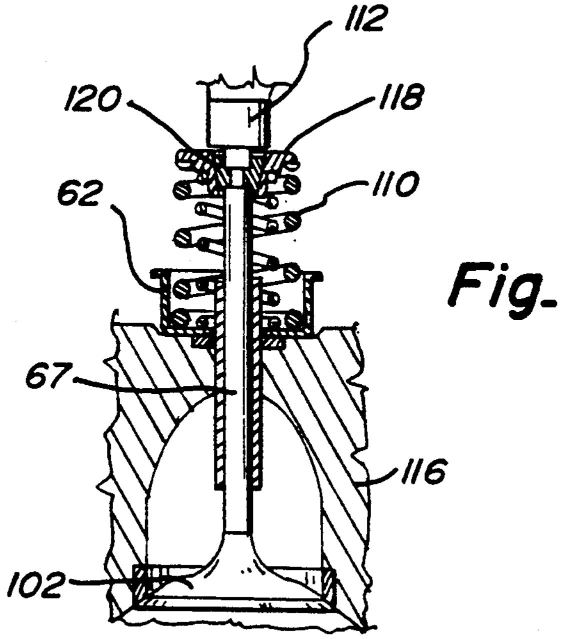
FIG. 6 is a section view of the intake valve and valve spring taken along line 6—6 of FIG. 5.

The valve spring seat or retainer 62 is shaped in the form of a flanged cup-shaped washer defining an opening 66 in its center allowing the valve spring seat to be located around a valve stem 67 (FIG. 8). Surrounding the opening 66 is a lip or engagement ring 68 extending radially outward from a surface 70 normal to the opening.

The pump assembly 64 is a hand-held unit comprised of a body 72, a handle 74 and an extended arm 76. The body 72, discussed in detail below, includes an extension piston 78 which extends from the body when the pump assembly is actuated. Located on the handle 74 of the pump assembly 64 is a coupling 80 to which a source of pneumatic supply air can be attached (not shown). Also located on the handle are two buttons which may be pressed by an operator. The first, a directional valve button 82, is used to actuate the pump assembly. The second, a bleed valve button 84, is used to bleed air pressure from the pump body 72.

The arm 76 extending from the body 72 has a proximal end 86 and a distal end 88. The proximal end is connected to the body. The distal end of the arm has an engaging clip 90 extending perpendicularly therefrom. The engaging clip 90 may be C-shaped or U-shaped so that it may be engaged alongside the surface 70 and underneath the lip 68 of the valve spring seat 62.

Figure 1:
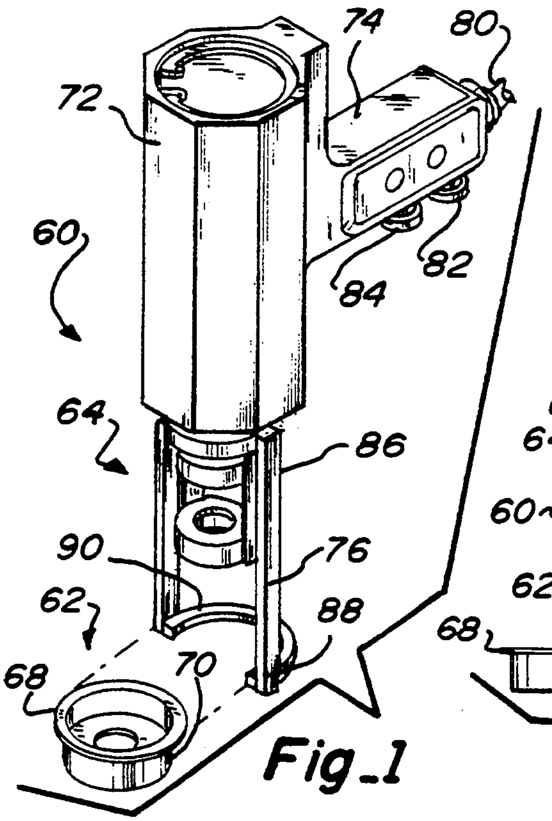
FIG. 1 is a perspective view of a two-part valve spring compressor apparatus embodying the present invention.
Figure 2:
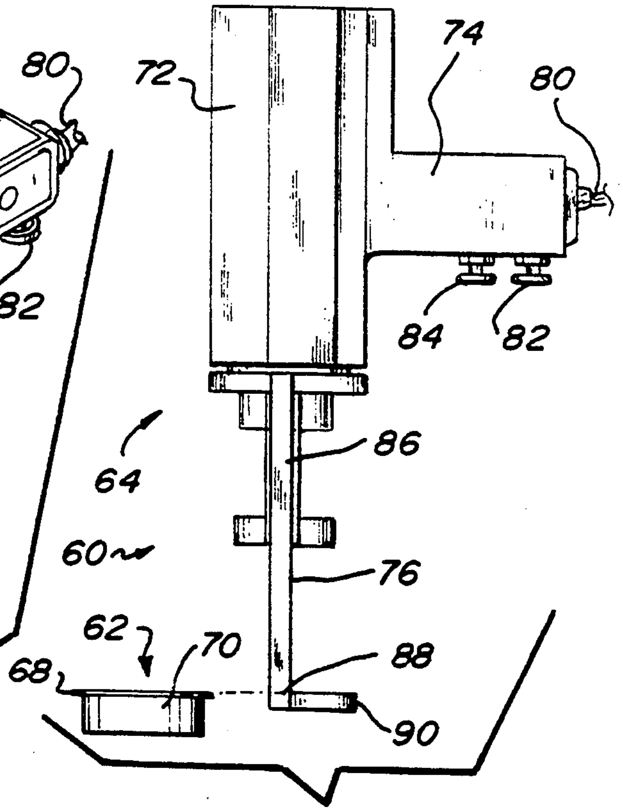
FIG. 2 is a side view of the apparatus of FIG. 1.
Figure 3:
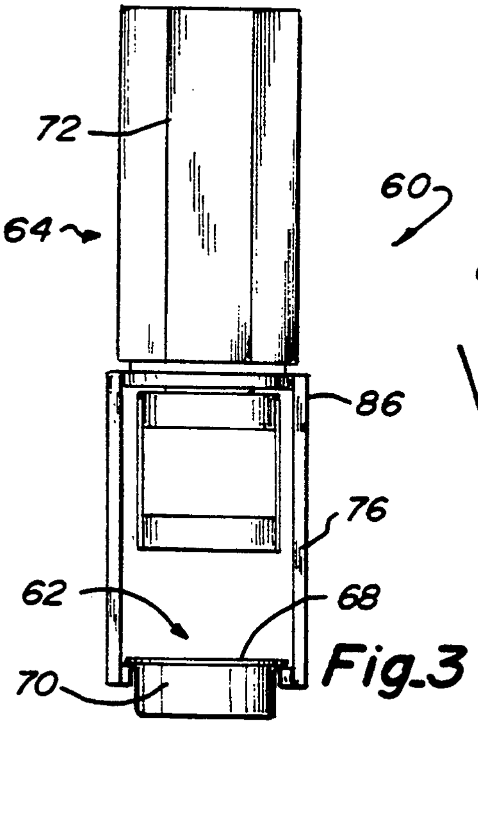
FIG. 3 is a top view of the apparatus of FIG. 1.
Figure 4:
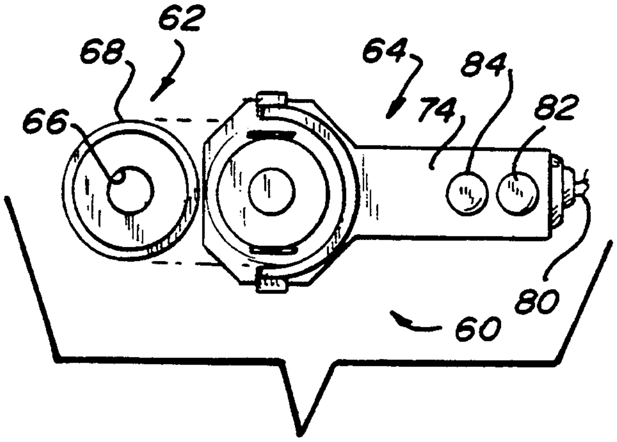
FIG. 4 is a front view of the apparatus of FIG. 1.
Figure 5:
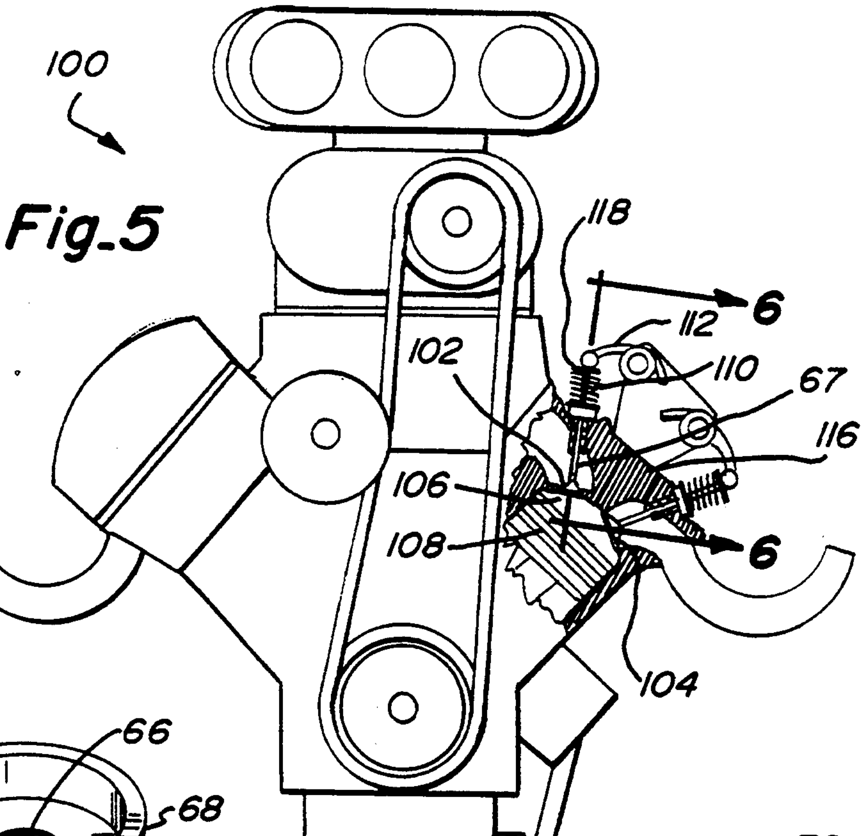
FIG. 5 is a partial section view of an automotive racing engine showing the position of the intake and exhaust valves and valve springs.

Before describing the invention in further detail, the pertinent components and requirements of automotive internal combustion engines will be briefly discussed. Automotive engines 100 commonly have an intake valve 102 and an exhaust valve 104 for each cylinder 106 of the engine (FIG. 5). The intake valve 102 allows the fuel-air mixture to enter the cylinder 106 prior to ignition. The exhaust valve 104 allows exhaust gases to exit the cylinder subsequent to ignition. Both of the valves 102 and 104 are closed during ignition and during the resulting expansion of gas in the cylinder which drives a piston 108 located in the cylinder. Accurate timing and control of the intake and exhaust valves' operation is essential to optimum engine performance.

Each valve 102 and 104 is controlled through the cooperative action of a valve spring 110 together with a camshaft (not shown), pushrod (not shown) and rocker arm 112 assembly all of which are known in the art. The valve spring 110 is located coaxially along the stem 67 of the valve and held in place against the engine housing 116 by a conventional arrangement of a ring-shaped valve spring retainer 118 and a valve spring keeper or keeper lock 120 which can be removably attached to a first end of the valve stem 67. With the valve spring held in place thusly, the first end of the valve stem 67 is maintained at a maximum distance from the engine housing 116 causing the valve to be held firmly against the interior of the engine housing closing the valve. The valve may be opened by movement of the rocker arm 112 which moves the valve stem toward the engine housing and opens the valve. This movement of the valve stem is resisted by the spring force of the valve spring 110. Therefore, when the rocker arm returns to its original position the valve will be closed by the action of the valve spring.

High-performance racing engines have much more stringent valve and valve spring requirements than engines in passenger automobiles. This is because racing engines must perform at continuous high speeds and therefore have larger cylinders along with increased fuel-air intake and increased exhaust. These requirements result in a typical valve opening distance of approximately 0.850 inches in racing engines as opposed to typically 0.375 inches in passenger engines. Further, the valve is only completely closed for twenty degrees of the three hundred-sixty degree intake-compression-ignition-exhaust cycle of a racing engine in contrast to over one hundred-thirty-five degrees of the three hundred sixty degree cycle of a passenger engine. Because of the need to open and close the valves so far, so rapidly and so accurately together with the need to withstand the high pressure exhaust, valve springs in racing engines must have a very high spring force as compared to passenger engines. These springs are often composed of expensive, strong materials such as titanium. When the valve is in the normally closed position the force exerted by a racing valve spring may be in a range of two hundred-fifty to three hundred pounds in contrast to a range of eighty to one hundred-twenty pounds for a passenger engine.

Figure 7:
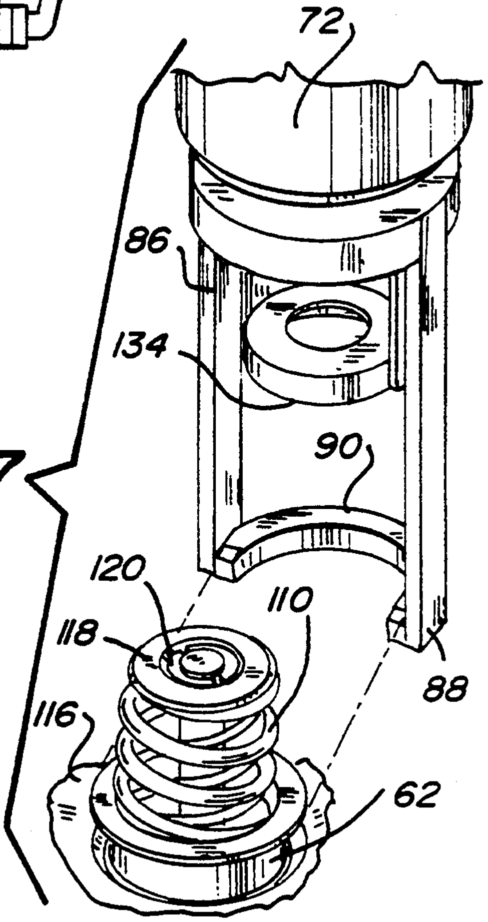
FIG. 7 is a perspective view of the pump assembly of the present invention engaged with the valve spring seat of the present invention.
Figure 9:
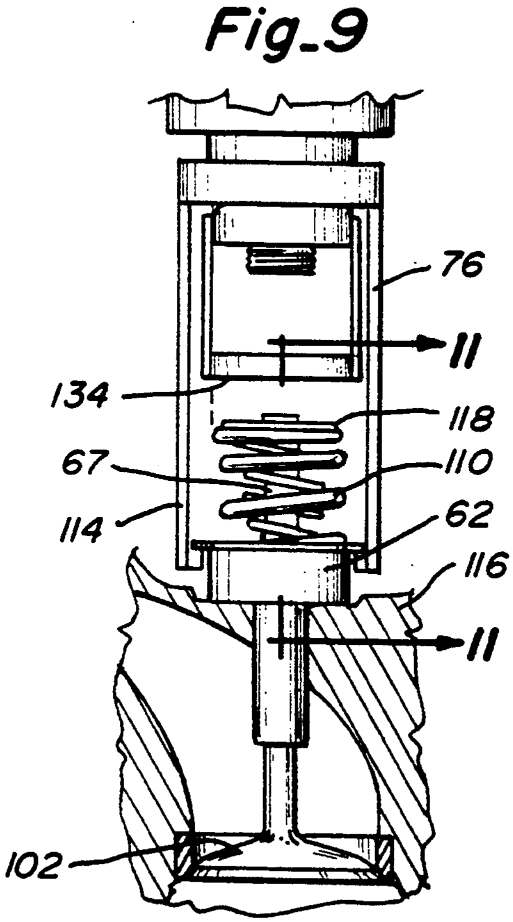
FIG. 9 is a section view of a valve and valve spring with the pump assembly of the present invention engaging the valve spring seat of the present invention.
Figure 10:
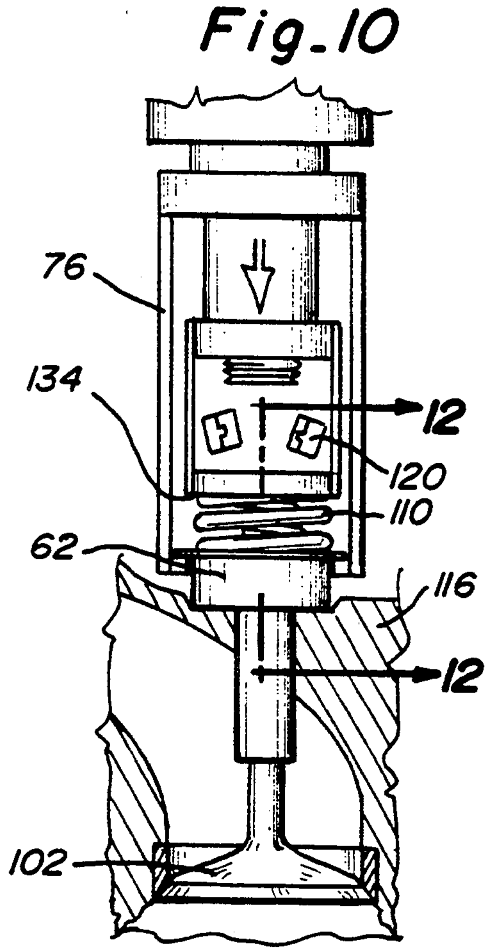
FIG. 10 is a section view similar to FIG. 9 showing the extension piston of the pump assembly in compression engagement with the valve spring.
Figure 11:
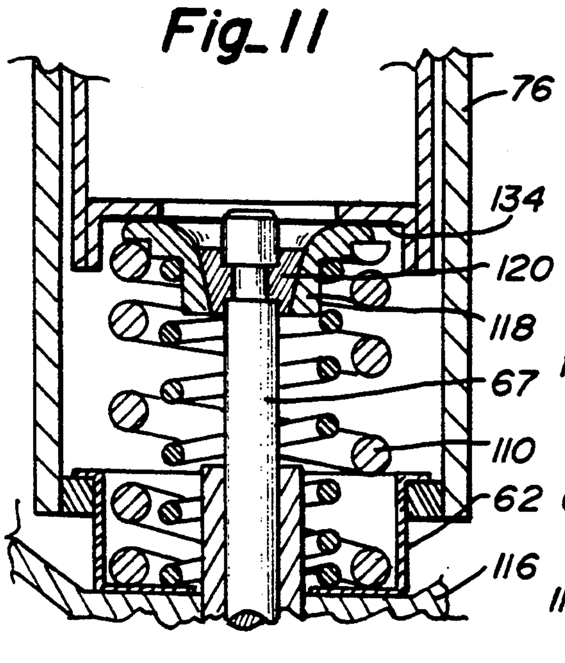
FIG. 11 is a close-up section view taken along line 11—11 of FIG. 9.
Figure 12:
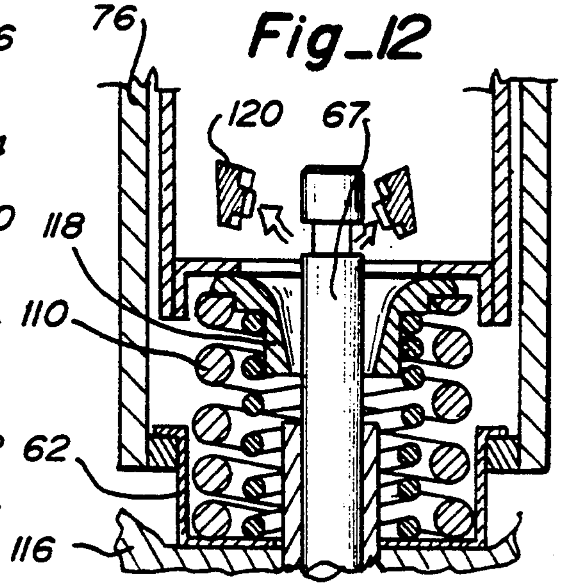
FIG. 12 is a close-up section view taken along line 12—12 of FIG. 10.
Figure 13:
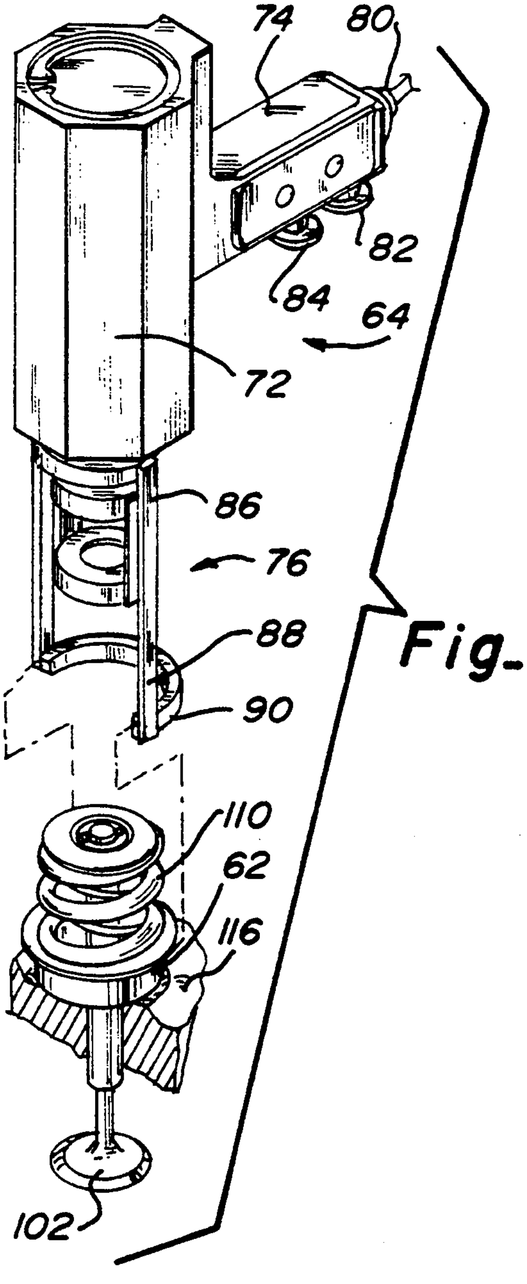
FIG. 13 is a top perspective view of the pump assembly, the valve, valve spring and valve spring seat.
Figure 14:
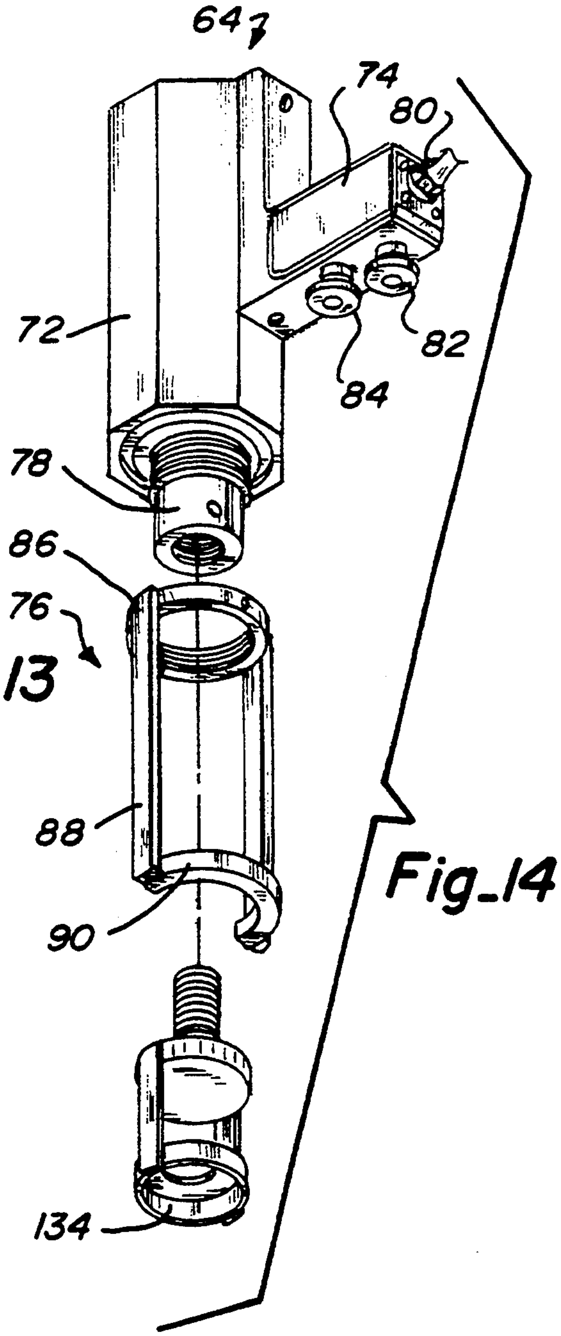
FIG. 14 is a partially exploded view of the pump assembly showing the arm and extension piston.
Figure 15:
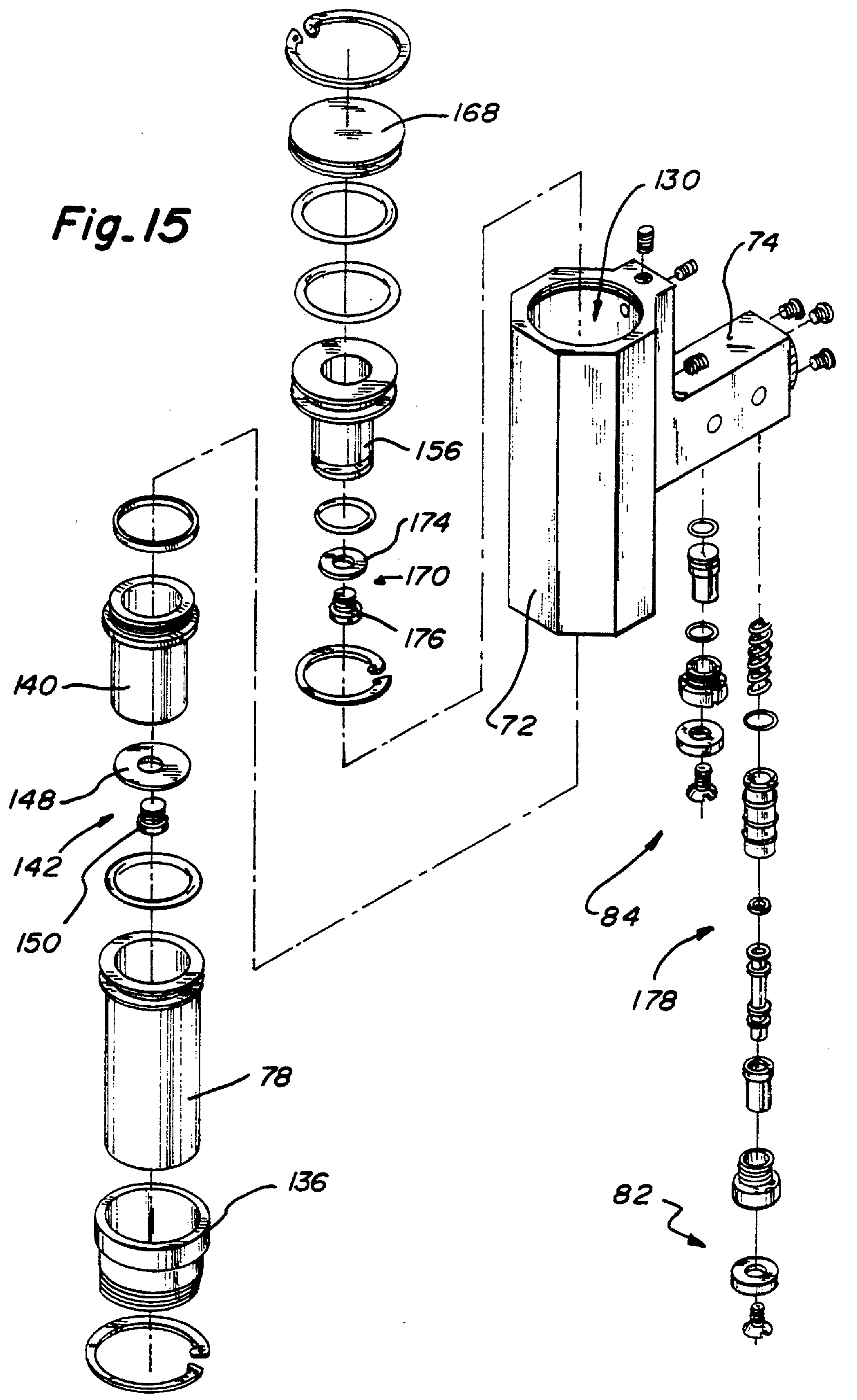
FIG. 15 is an exploded view of the pump assembly of the present invention showing the internal components.
Figure 16:
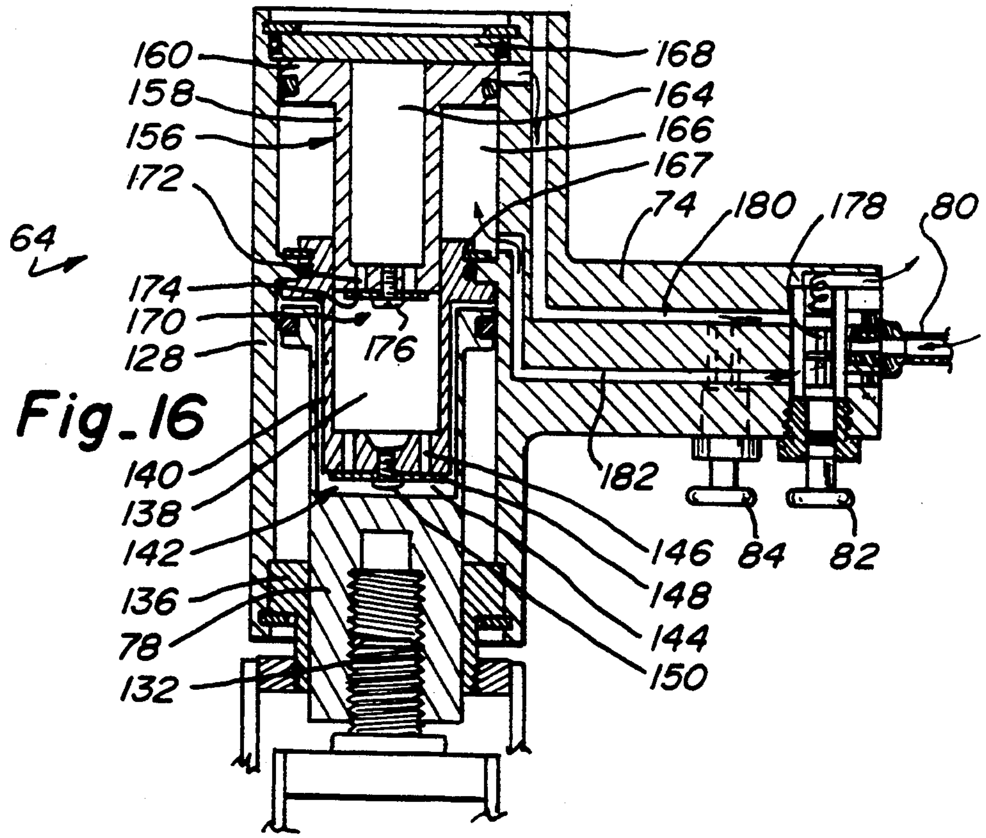
FIG. 16 is a sectional schematic view of the pump assembly showing the return of the power piston to the standby position.
Figure 17:
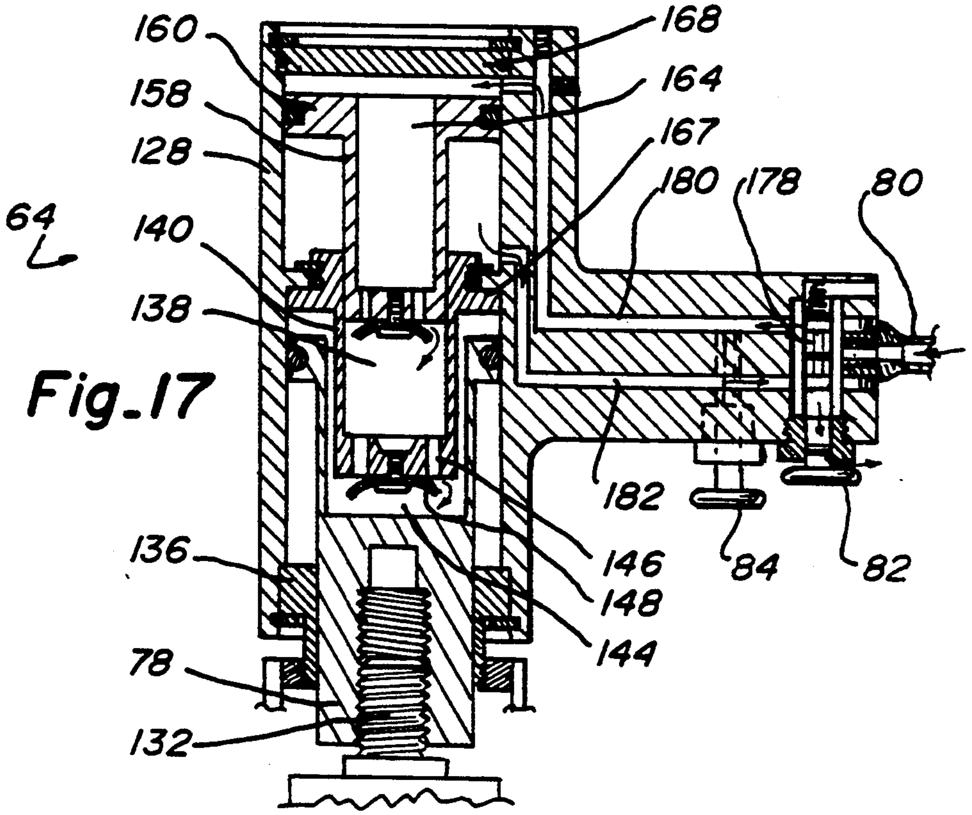
FIG. 17 is a sectional schematic view of the pump assembly showing the directional valve button actuated to drive the power piston off the standby position.
Figure 18:
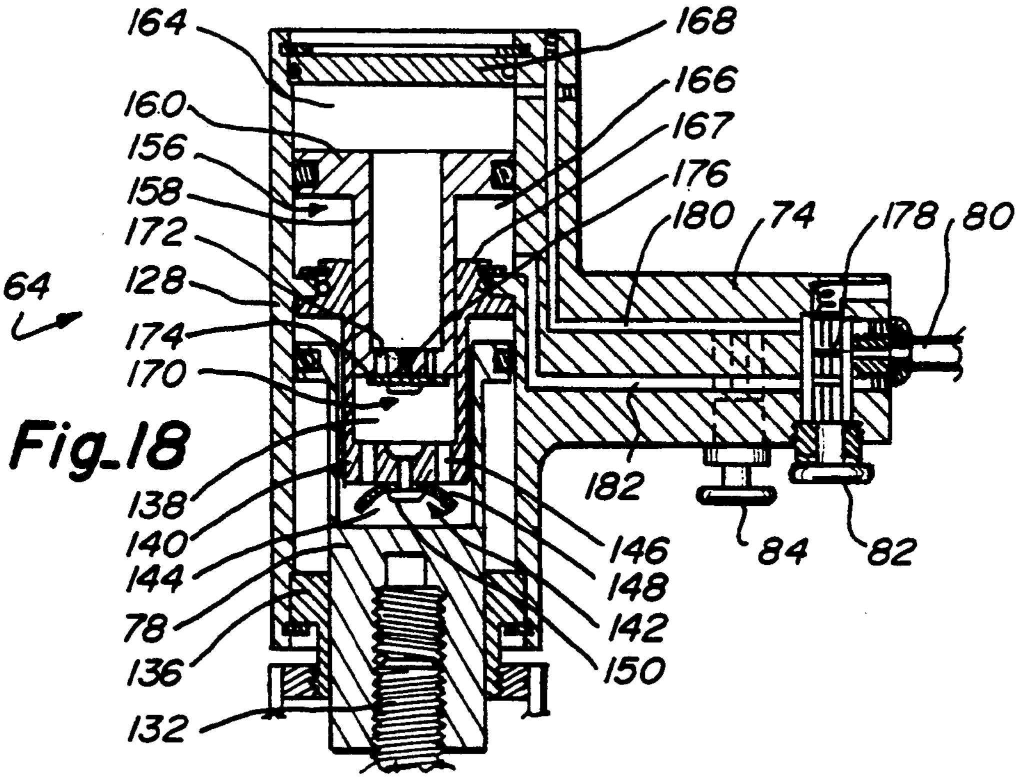
FIG. 18 is a sectional schematic view of the pump assembly showing the power piston check valve closing during the compression stroke to create the pressure multiplication effect.
Figure 19:
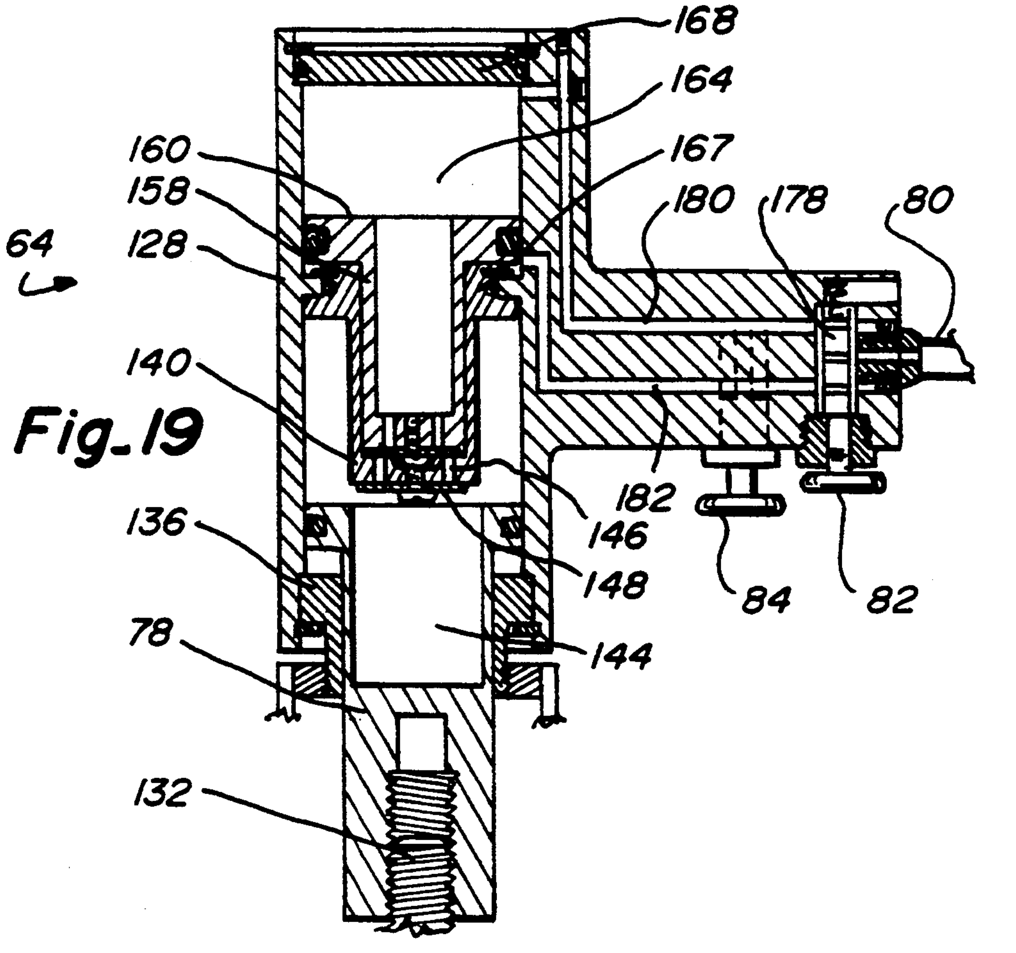
FIG. 19 is a sectional schematic view of the pump assembly showing the power piston at the end of its stroke with the extension piston partially extended.
Figure 20:
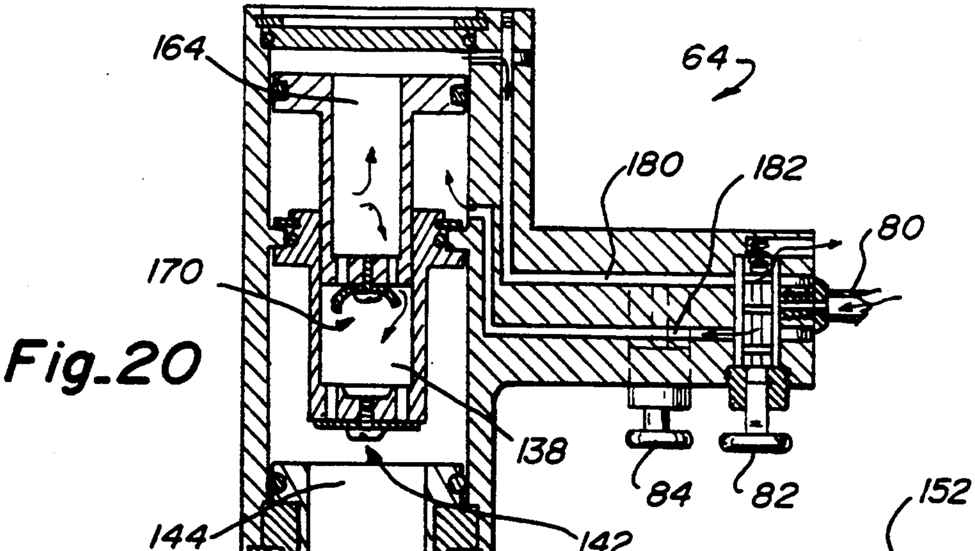
FIG. 20 is a sectional schematic view of the pump assembly showing the directional valve deactuated to cause the power piston to return to the standby position.
Figure 22:
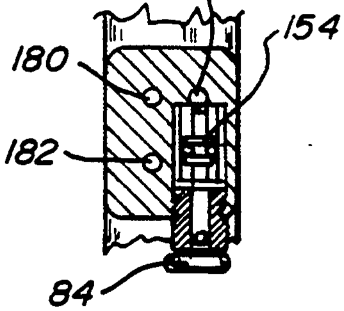
FIG. 22 is a partial section view of the handle of the pump assembly showing the communication between the directional valve and bleed valve buttons and the three passageways.

The valve spring compressor apparatus 60 of the present invention can be seen in operation in FIGS. 7, 9 and 11. When the valve spring is initially installed, the valve spring seat 62 is placed around the valve stem 67 and between the engine housing 116 and the valve spring 110. To remove the valve spring, the valve spring retainer and keeper 118 and 120 must be removed from the valve stem while the valve spring is compressed and moved away from the valve spring keeper (FIGS. 10 and 12). To accomplish this, the pump assembly 64 is placed adjacent the valve spring 110 to engage the engaging clip 90 with the valve spring seat 62. The directional valve button 82 is then used to actuate the pump assembly 64. As a result, the extension piston 78 moves against the valve spring. The valve spring keeper 120 can then be removed from the valve stem 80.

After the valve spring keeper 120 is removed, the valve spring 110 can then be decompressed. This is done with the use of the bleed valve button 84 as described further below. The bleed valve button can be controlled by the operator to adjust the rate and distance of retraction of the extension piston 78 back into the body 72 of the pump assembly 64. After the extension piston 78 is retracted sufficiently to decompress the valve spring, the pump assembly can be removed from the valve stem 67 by disengaging the engaging clip 90 from the valve spring seat 62.

With the pump assembly 64 removed from the valve stem 67, the valve spring 110 can be removed and a new valve spring can be installed. The operation of the valve spring compressor assembly 60 is then repeated in a similar fashion to compress the new valve spring so that the valve spring keeper 120 may be re-installed. After the pump assembly is again removed from the valve stem, the operation of removing and replacing a valve spring is complete.

The internal components of the pump assembly 64 can be seen in FIGS. 15–22. A pump housing 128 comprises the body 72 and handle 74 of the pump assembly. A large longitudinal bore 130 extends completely through the body of the pump housing 128.

Located within the longitudinal bore 130 is the extension piston 78 which itself has an internal bore 132 extending along its longitudinal axis. This bore 132 does not extend entirely through the extension piston. The bore 132 allows the extension piston to be placed over the valve stem 67 and extend and retract therealong. Located radially outside of the bore 132 on the extension piston is a contact surface 134 which contacts the valve spring 110 when the piston is extended. The extension piston slides along the inner surface of a piston guide 136 which is attached to the pump housing 128. Together, the contact surface 134 and the engaging clip 90 comprise a pair of jaws which may be drawn toward each other by the pump assembly 64.

Also located within the longitudinal bore 130 in the pump housing 128 is a compression chamber 138 which is defined by a compression chamber housing 140. The chamber housing 140 is cylindrical in shape with one closed end and one open end. Located on the closed end is an extension piston check valve 142 which can either allow or prevent fluid communication between the compression chamber 138 and an extension piston chamber 144 comprised of the volume between the compression chamber housing 140 and the extension piston 78. The extension piston check valve 142 is a one-way valve comprised of an annular opening 146 in the closed end of the compression chamber housing 140 which is covered by a pliable, mylar washer 148. The check valve 142 seals the opening when the air pressure in the extension piston chamber 144 exceeds the air pressure in the compression chamber 138. The washer 148, held in place by a screw 150, is commercially available as Part No. 33056 from Holo-Krome of West Hartford, Conn. When the air pressure in the extension piston chamber 144 does not exceed the air pressure in the compression chamber 138, the washer 148 is not forced against the compression chamber housing 140 and thus there is no seal.

A power piston 156 is also located in the longitudinal bore 130 of the pump housing 128. A cylindrical section 158 of the power piston 156 is located in the open end of the compression chamber housing 140 so that the power piston 156 may move freely in and out of the compression chamber 138. A flange section 160 of the power piston 156 moves freely back and forth in the longitudinal bore 130. An O-ring 162 located on the radial outer surface of the flange section 160 serves to provide a fluid seal between a power piston chamber 164 and a power piston return chamber 166. The power piston return chamber 166 comprises the volume between the flange section 167 of the compression chamber housing 140 and the flange section 160 of the power piston 156. The power piston chamber 164 comprises the volume between the power piston 156 and a back wall 168 located at the end of the longitudinal bore 130 in the pump housing 128.

The power piston chamber 164 is in fluid communication with the compression chamber 138 when a power piston check valve 170 is open. The power piston check valve 170 is similar in function and components to the extension piston check valve 142. An annular opening 172, a mylar washer 174 and a screw 176 comprise the power piston check valve 170. When the fluid pressure in the compression chamber 138 exceeds the fluid pressure in the power piston chamber 164, the power piston check valve 170 will close.

A directional valve 178 can route supply air from the coupling 80 to either the power piston chamber 164 or the power piston return chamber 166 through a first passageway 180 or a second passageway 182, respectively. The directional valve 178 is actuated by pressing the directional valve button 82 toward the handle 74. When the button 82 is pressed, supply air is provided to the power piston chamber 164 through the first passageway 180. The directional valve 178 also vents the power piston return chamber 166 to the ambient atmosphere through the second passageway 182 when the button 82 is pressed. When the button 82 is released, the directional valve reverses the situation. Supply air is then provided to the power piston return chamber 166 through the second passageway 182 and the power piston chamber 164 is vented to the ambient atmosphere through the first passageway 180.

Figure 21:
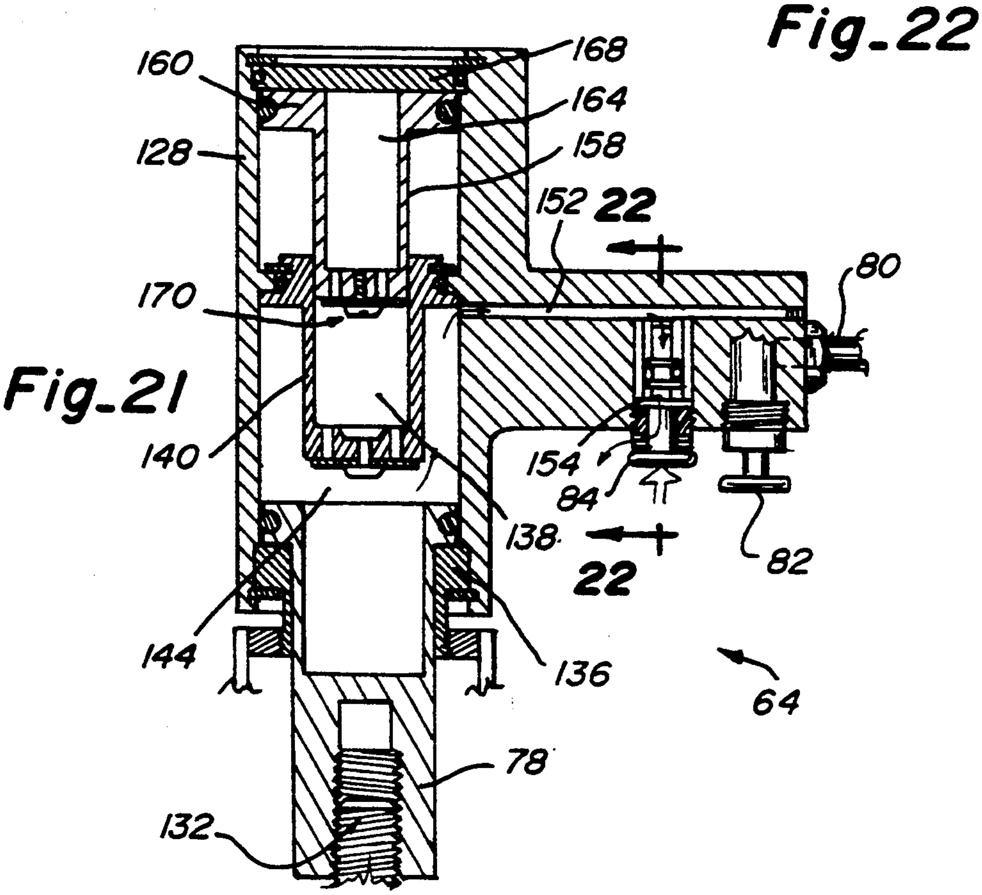
FIG. 21 is a sectional schematic view of the pump assembly showing the bleed valve button actuated to release pressure from the extension piston chamber.

A third passageway 152 leads from the extension piston chamber 144 through the handle 74 of the pump assembly 64 to a bleed valve 154 (FIG. 21). The bleed valve 154 is actuated by pressing the bleed valve button 84 toward the handle. With the button 84 in this position there is open fluid communication from the extension piston chamber 144 to the ambient atmosphere through the third passageway 152. Therefore, actuation of the bleed valve 154 will bleed fluid pressure from the pump assembly 102.

The operation of the pump assembly 64 can now be explained. The pump assembly is positioned adjacent to the valve spring 110 to place the engaging clip 90 on the distal end 88 of the arm 76 under the lip 68 of the valve spring seat 62. A source of supply air (not shown) is connected to the coupling 80 and the bleed valve is actuated to normalize the air pressure in the extension piston chamber 144 so that the extension piston is in a retracted state. With the directional valve not yet actuated, the supply air pressure in the power piston return chamber 166 will drive the power piston 156 against the back wall 168.

The directional valve 178 is actuated to begin the pumping/compressing operation. Supply air enters the power piston chamber 164. Since the power piston return chamber is now vented to the atmosphere the force exerted against the power piston 156 by the supply air pressure in the power piston chamber 164 exceeds the force exerted in the power piston return chamber 166 against the power piston 156 and the power piston is driven longitudinally into the compression chamber 138. Both the power piston check valve 170 and the extension piston check valve 142 are open. Therefore, the supply air pressure is present in the compression chamber 138, the extension piston chamber 144 as well as the power piston camber 164. This pressure in the extension piston chamber 144 causes the extension piston 78 to extend until it meets with a force which is equal to the supply air pressure multiplied by the surface area of the extension piston normal to the direction of travel of the extension piston. The valve spring 110 supplies this force upon the slightest compression. However, typical valve springs used in automotive racing require far greater force to compress them sufficiently to remove the valve spring keeper 120. In fact, after the heavy use of the valves in racing, the valve spring keeper may have "wedged in" or become overtightened into the valve stem requiring a great force to compress the valve spring.

When the extension piston 78 is stopped by the force of the valve spring 110, the air pressure in the extension piston chamber 144 and compression chamber 138 becomes greater than the air pressure in the expanding power piston chamber 164 and the power piston check valve 170 closes. At this moment the air pressure in the compression chamber 138 is only slightly greater than the supply air pressure. However, the surface area of the power piston 156 in the compression chamber 138 which is normal to the direction of movement of the piston is much smaller than the surface area of the power piston 156 in the power piston chamber 164 which is normal to the direction of movement of the piston. Preferably, the normal surface area in the power piston chamber 164 is 4.5 times greater than the normal surface area in the compression chamber 138. Therefore, the power piston will be driven further into the compression chamber 138 until the air pressure in the compression chamber and extension piston chamber 144 is 4.5 times greater than the supply air pressure or until the power piston abuts the closed end of the compression chamber, whichever comes first. As a result, the extension piston 78 exerts a greater force against the valve spring 110. At this point, the extension piston check valve 142 closes, trapping the multiplied air pressure in the extension piston chamber. The first pressure multiplication cycle is now complete.

To further compress the valve spring, the operator releases the directional valve button 82 and presses it again. Upon the release of the button 82, the directional valve 178 vents the supply air from the power piston chamber 164 and provides supply air to the power piston return chamber 166. This causes the power piston to be driven back to its initial position against the back wall 168. As the power piston 156 exits the compression chamber 138, the rapidly expanding volume in the compression chamber results in a low air pressure which opens the power piston check valve 170 and draws in some of the supply air pressure being forced out of the power piston chamber 164. This results in air pressure in the compression chamber 138 which is greater than the ambient atmospheric pressure of the power piston chamber 164 so the power piston check valve 170 closes.

When the operator again presses the directional valve 82, the supply air drives the power piston 156 into the compression chamber 138 as before. However, now each of the check valves 142 and 170 are closed and pressure multiplication again occurs. Since the power piston check valve 170 is closed at the beginning of this compression cycle, the pressure multiplication of 4.5 will occur before the power piston 156 reaches the closed end of the compression chamber 138. As soon as the air pressure in the compression chamber equals the air pressure in the extension piston chamber 144, the extension piston check valve 142 opens. In this way the multiplied pressure is maintained in the extension piston chamber 144. This is necessary because as the extension piston moves out of the pump housing 64, the volume of the extension piston chamber becomes greater and therefore the pressure decreases proportionately. In this way, repeated cycling through pressure multiplication cycles can compress the valve spring sufficiently to remove or install valve spring keepers. Typically, only two or three cycles of the pump assembly are required to compress the valve spring sufficiently to remove the valve spring keepers.

As can be appreciated, the present invention provides the capability of easily removing and replacing valve springs on automotive racing engines, and, of course, on other automotive engines as well. It can be seen that with a pressure multiplication factor of 4.5, and with a supply air pressure of one hundred pounds per square inch the pressure in the extension piston chamber will be 450 PSI. Since the diameter of the extension piston is 2.25 inches, the normal surface area is 3.97 square inches. Therefore, the extension piston is capable of exerting a clamping force of 3.97 square inches times 450 PSI or over 1785 pounds. Even when the valve spring compressor system is used with a low-end compressed air source having only 60 PSI, the clamping force is over 1070 pounds. This is more than enough to compress valve springs for removal and replacement.

A presently preferred embodiment of the present invention has been described above with a degree of specificity. It should be understood, however that this degree of specificity is directed toward the preferred embodiment. The invention itself, however, is defined by the scope of the appended claims.

I claim:

1. A multi-part valve spring compressor apparatus for compressing a valve spring to facilitate removal and replacement thereof from a stem of a valve of an internal combustion engine, comprising in combination:

a valve spring seat having a bottom wall having an annular surface defining a circular opening therethrough, a radial wall depending from the bottom wall and a lid extending radially outwardly from the radial wall, the radial wall forming an annular surface on an exterior surface thereof, Said circular opening having a diameter relatively larger than the diameter of the valve stem, the bottom wall of the seat being in contact with and retained between the valve spring and a housing of the engine at a location where the stem of said valve projects from the housing of said engine, said stem projecting through said circular opening of said seat so that said seat encircles said stem, said bottom wall add said radial wall forming a cup to receive said valve spring there within;

a support for selectively abutting said lid of said valve spring seat in juxtaposition with and in close proximate relation with said annular surface on said radial wall of said seat; and extension means connected to said support for extending a piston along a longitudinal axis of the valve stem, valve spring, and the abutted support and seat and for then biasing said valve spring by contacting a retainer ring releasably connected to said valve stem by a keeper lock and compressing said spring between said seat and said retainer ring until said keeper lock is removed from said stem and said valve spring is released from its compressed position between said seat and said retainer ring.

2. A valve spring compressor apparatus as defined in claim 1 wherein said extension means is a pump assembly connectable to a source of compressed air, further comprising:

a pump housing; and a compression chamber within the pump housing wherein air is compressed for applying force to said piston.

3. A valve spring compressor apparatus for compressing a valve spring to facilitate removal and replacement thereof from a valve of an internal combustion engine comprising in combination:

a valve spring seat positioned between the valve spring and a housing of the engine at a location where a stem of said valve projects from the housing of said engine, said valve spring seat having an opening formed therein through which said stem projects, and said seat further having engagement means formed thereon;

a support for selectively abutting said engagement means of said valve spring seat; and extension means connected to said support for extending a piston along a longitudinal axis of the valve, valve spring, and the abutted support and seat and for then biasing said valve spring by contacting a retainer ring releasably connected to said valve stem by a keeper lock and compressing said spring between said seat and said retainer ring until said keeper lock is removed from said stem and said valve spring is released from its compressed position between said seat and said retainer ring wherein said extension means is a pump assembly connectable to a source of compressed air, further comprising:

a pump housing defining a longitudinal bore therethrough;

a back wall at one end of said longitudinal bore;

a power piston located in the longitudinal bore having a flange section which slides along the periphery of said longitudinal bore and further having a hollow cylindrical section with a diameter less than an outer diameter of the flange section, the hollow cylindrical section defining a power piston chamber;

a hollow compression chamber housing located in the longitudinal bore, defining a compression chamber into which the cylindrical section of said power piston may slide;

a first valve means located on the power piston for controlling the fluid communication between the power piston chamber and the compression chamber;

further wherein said extension piston is hollow, defining an extension piston chamber; and a second valve means located on the compression chamber housing for controlling the fluid communication between the compression chamber and the extension piston chamber.

4. A valve spring compressor apparatus as defined in claim 2, further comprising:

a directional valve located in the pump housing and connected in fluid communication with both the source of compressed air and the atmosphere;

a first passageway connecting, in fluid communication, the power piston chamber with the directional valve; and a second passageway connecting, in fluid communication, the volume defined by the exterior of the cylindrical section of the power piston, the flange section of the power piston, the flange section of the compression chamber and the pump housing.

5. A valve spring compressor apparatus as defined in claim 4, further comprising:

a bleed valve located in the pump housing and connected in fluid communication with the atmosphere; and a third passageway connecting, in fluid communication, the extension piston chamber with the bleed valve.

6. A valve spring compressor apparatus as defined in claim 2 wherein said first valve means is a mylar washer covering an annular opening in the power piston and said second valve means is a mylar washer covering an annular opening in the compression chamber housing.

7. A valve spring compressor apparatus as defined in claim 3, further comprising:

a first o-ring attached to the flange section of the power piston for contacting the surface of said longitudinal bore of said pump housing, and a second o-ring attached to the extension piston for contacting the surface of said longitudinal bore of said pump housing.

8. A valve spring compressor apparatus as defined in claim 3 wherein said first valve means substantially prevents the flow of fluid from the compression chamber into the power piston chamber and said second valve means substantially prevents the flow of fluid from the extension piston chamber into the compression chamber.

9. A valve spring compressor apparatus as defined in claim 3 wherein said valve spring seat of the apparatus is a flanged cup-shaped washer.

* * * * *